United States Patent [19]
Ohashi et al.

[11] Patent Number: 5,144,339
[45] Date of Patent: Sep. 1, 1992

[54] LASER SCANNER WITH DEFLECTOR AND PHOTOSENSITIVE DRUM CONTROL

[75] Inventors: Tsuyoshi Ohashi, Hashima; Shinichi Hirahata, Kagamigahara, both of Japan

[73] Assignee: Brother Kogyo Kabushiki Kaisha, Nagoya, Japan

[21] Appl. No.: 606,126

[22] Filed: Oct. 30, 1990

[30] Foreign Application Priority Data

Feb. 7, 1990 [JP] Japan .................. 2-11860[U]

[51] Int. Cl.⁵ .............................................. H04N 1/21
[52] U.S. Cl. ....................................... 346/108; 358/296
[58] Field of Search ................ 346/108, 107 R, 76 L, 346/160; 358/296

[56] References Cited

U.S. PATENT DOCUMENTS

| | | | |
|---|---|---|---|
| 4,059,833 | 11/1977 | Kitamura et al. | 346/108 |
| 4,647,946 | 3/1987 | Inuyama | 346/108 |
| 5,023,631 | 6/1991 | Negishi et al. | 346/154 |

FOREIGN PATENT DOCUMENTS 62-84656 4/1987 Japan .

Primary Examiner—Mark J. Reinhart
Attorney, Agent, or Firm—Oliff & Berridge

[57] ABSTRACT

An exposing device for scanning a photosensitive drum with a laser beam includes a laser beam emitter, a polygonal mirror, a mirror motor and a controlling unit having a timer circuit. The laser beam emitter emits a laser beam based on information of an image. The polygonal mirror deflects the laser beam emitted from the laser beam emitter to the photosensitive drum. The mirror motor rotates the polygonal mirror. When the exposing operation is executed, the controlling unit drives the mirror motor and the laser beam emitter. The photosensitive drum is thus scanned by the laser beam and is exposed. The controlling unit stops the driving of the laser beam emitter when the scanning of the photosensitive drum is finished. The controlling unit continually drives the mirror motor during a predetermined time from the end of the scanning of the photosensitive drum. The controlling unit stops the driving of the mirror motor after the predetermined time passes.

16 Claims, 2 Drawing Sheets

LASER SCANNER WITH DEFLECTOR AND PHOTOSENSITIVE DRUM CONTROL

BACKGROUND OF THE INVENTION

1. Field of the Invention

The present invention relates to an exposing device for use in a laser printer or the like and, more particularly, to an exposing device for scanning a photosensitive member in a laser printer with a laser beam.

2. Description of Related Art

In the conventional exposing device, a laser beam is generated from a laser beam source according to image information supplied by a control device, and the laser beam is reflected by a polygonal mirror rotated by a mirror motor. The laser beam reflected by the polygonal mirror irradiates a photosensitive drum rotated by a drum motor. Conventionally, three types of exposing devices are known. The first type always rotates the mirror motor, the second type rotates the mirror motor only when the exposing operation is executed, and the third type rotates the mirror motor only when the control device has image information. The third type of exposing device is disclosed in Japanese Pat. laid open SHO 62-84656.

The mirror motor rotates at a high speed and cannot be used for a long time, especially if the mirror motor is always rotated as the first type is. Moreover, since the mirror motor of the first type rotates even when the exposing operation is not being executed, noise is always generated. On the other hand, if the mirror motor of the second type or third type is rotated only when the exposing operation is executed or only when the control device has image information, it is then necessary to delay the exposing operation until the rotational speed of the mirror motor reaches its predetermined rotational speed, when the next exposing operation is started after a prior exposing operation is finished or after prior image information in the control device is completely used. Accordingly, the exposing operation cannot be started immediately.

SUMMARY OF THE PRESENT INVENTION

An object of the present invention is to provide an exposing device which is able to use moving means such as a motor for a long time.

Another object of the present invention is to provide an exposing device in which noise generation is minimized.

A further object of the present invention is to provide an exposing device which enables immediate execution of an exposing operation.

To achieve the foregoing and other objects and advantages, an exposing device for exposing a photosensitive member according to the present invention is provided with the following: laser beam emitting means for emitting a laser beam based on information of an image; deflecting means for deflecting the laser beam emitted from said laser beam emitting means to the photosensitive member; moving means for moving said deflecting means in order to scan the photosensitive member with the laser beam deflected by said deflecting means; and controlling means for stopping said moving means after a predetermined time passes from the end of scanning of the photosensitive member.

According to the exposing device of the present invention, the laser beam emitting means emits a laser beam based on information of an image. The deflecting means deflects the laser beam emitted from the laser beam emitting means to the photosensitive member, and the moving means moves the deflecting means. The photosensitive member is thus scanned with the laser beam and is exposed. The controlling means continually drives the moving means during a predetermined time from the end of the scanning of the photosensitive member. The controlling means further stops the driving of the moving means after the predetermined time passes.

The exposing device according to the present invention, is therefore able to use the moving means for a long period of time and is able to prevent continuous generation of noise because the controlling means stops the driving of the moving means when the predetermined time passes from the end of scanning of the photosensitive member. Moreover, after the exposing operation is executed, the controlling means keeps the moving means driving during the predetermined time. Accordingly, the next exposing operation can be started at once if the predetermined time has not passed.

BRIEF DESCRIPTION OF THE DRAWINGS

The present invention will be described in detail with reference to the following figures in which like reference numerals refer to like elements and wherein.

DETAILED DESCRIPTION OF THE PREFERRED EMBODIMENTS

Figure 1:
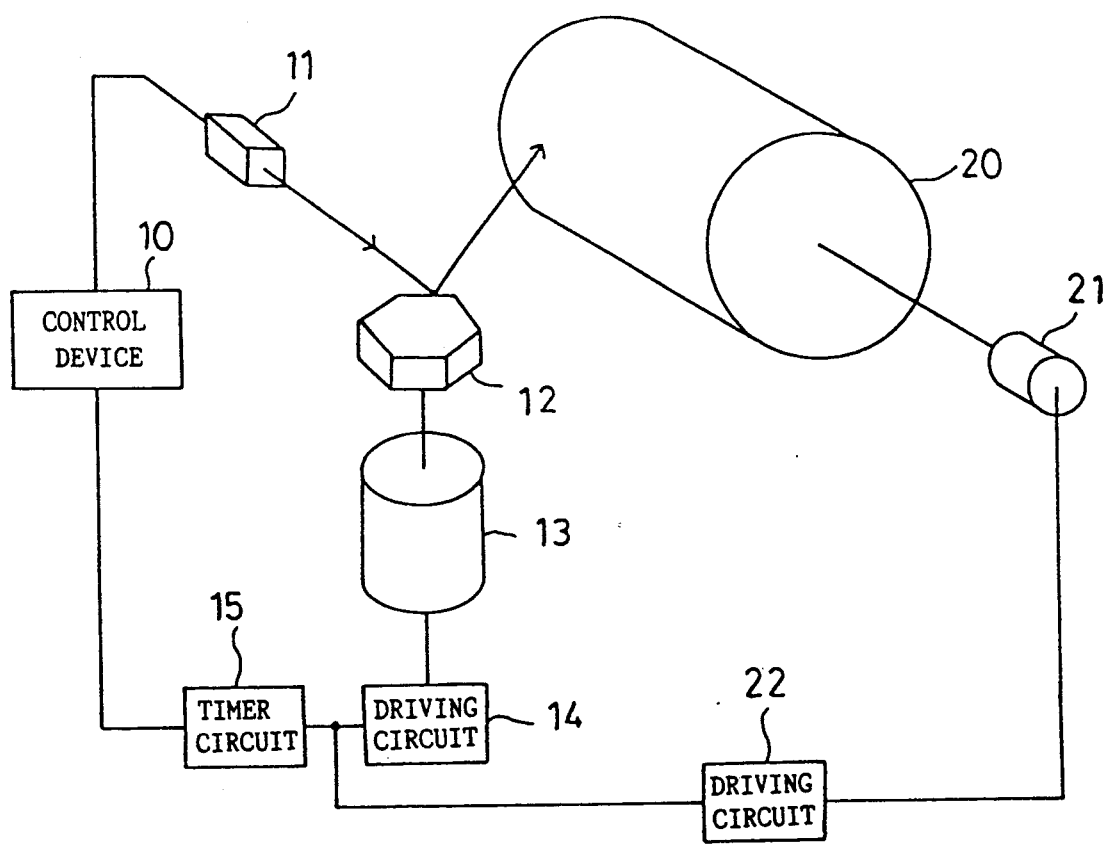
FIG. 1 is a schematic view showing one embodiment of an exposing device of the present invention.

Referring now to the drawings, and particularly to FIG. 1 thereof, an exposing device according to the present invention is described.

A laser beam emitter 11 is connected to a control device 10. The laser beam emitter 11 emits the laser beam according to the driving signal based on the image information supplied by the control device 10. A polygonal mirror 12 for reflecting a laser beam from the laser beam emitter 11 is connected to a mirror motor 13, the mirror motor 13 rotating the polygonal mirror 12. The mirror motor 13 is connected to a driving circuit 14 for driving the mirror motor 13 at a predetermined rotational speed.

A photosensitive drum 20 scanned with the laser beam reflected by the polygonal mirror 12 is connected to a drum motor 21 for rotating the photosensitive drum 20. The drum motor 21 is connected to a driving circuit 22 for driving the drum motor 21 at a predetermined rotational speed. The driving circuits 14, 22 are respectively connected to the control device 10 through a timer circuit 15. The control device 10 supplies a driving signal A illustrated in FIG. 3 to the timer circuit 15.

Figure 2:
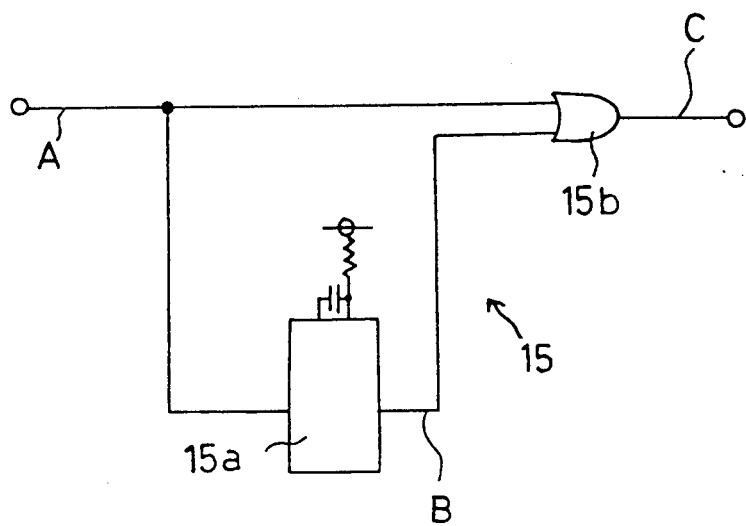
FIG. 2 is a circuit diagram showing a timer circuit of the exposing device.

As shown in FIG. 2, the timer circuit 15 includes a retriggerable one shot multivibrator 15a and an OR-gate 15b which has two input terminals. The one input terminal of the OR-gate 15b is directly connected to the control device 10 and the other input terminal is connected to the control device 10 through the retriggerable one shot multivibrator 15a. When a trigger signal is input from control device 10, the retriggerable one shot multivibrator 15a outputs a pulse signal, as a driving signal B shown in FIG. 3, during a predetermined time t. When the next trigger signal is input while the retriggerable one shot multivibrator 15a outputs the pulse signal, the retriggerable one shot multivibrator 15a successively outputs the pulse signal during the predetermined time t from the end of the input next trigger signal.

In addition, a well known charging device, a developing device, a transferring device, a paper feeding device, a cleaner, etc. (not shown) are provided around the photosensitive drum 20. An image is thus formed on a paper in accordance with the electrophotographic mode.

Next, the operation of the exposing device of this embodiment will be described. When the operation of an image formation is started, the control device 10 supplies the driving signal to the laser beam emitter 11 based on the image information. The laser beam emitter 11 emits a laser beam according to the driving signal based on the image information. At the same time the control device 10 supplies the driving signal A as shown in FIG. 3 to the timer circuit 15.

As shown in FIG. 2, the driving signal A is supplied to the retriggerable one shot multivibrator 15a and the one input terminal of the OR-gate 15b in the timer circuit 15. As shown in FIG. 3, the retriggerable one shot multivibrator 15a outputs the driving signal B based on the end of the driving signal A during the predetermined time t. When the next driving signal A is supplied before the predetermined time t passes, the retriggerable one shot multivibrator 15a continually outputs the driving signal B from the end of the next driving signal A during the predetermined time t. The driving signal B output from the retriggerable one shot multivibrator 15a is input to the other input terminal of the OR-gate 15b.

Figure 3:
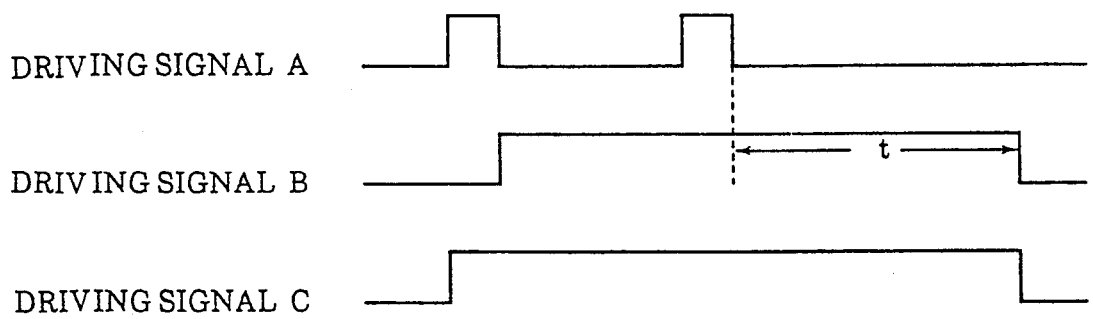
FIG.3 is a timing chart showing an operation of the exposing device.

The OR-gate 15b outputs a driving signal C as shown in FIG. 3 while the driving signal A is input or while the driving signal B is input. That is, the driving signal C is output from the timer circuit 15.

The driving signal C output from the timer circuit 15 is respectively input to the driving circuit 14 and the driving circuit 22. The driving circuit 14 drives the mirror motor 13 at a predetermined rotational speed based on the input of the driving signal C. The driving circuit 14 further stops the driving of the mirror motor 13 based on the end of the driving signal C. The polygonal mirror 12 is rotated by the mirror motor 13. The driving circuit 22 drives the drum motor 21 at a predetermined rotational speed based on the input driving signal C. The driving circuit 22 further stops the driving of the drum motor based on the end of the driving signal C. The photosensitive drum 20 is rotated by the drum motor 21.

The polygonal mirror 12 rotated by the mirror motor 13 scans the photosensitive drum 20 rotated by the drum motor 21 with a laser beam from the laser beam emitter 11. As a result, an electrostatic latent image based on the image information is formed on the surface of the photosensitive drum 20. The visible image which corresponds to the electrostatic latent image formed on the photosensitive drum 20 is then formed by the well known various devices provided around the photosensitive drum 20.

As mentioned above, in the exposing device of FIG. 1, after the first exposing operation is executed, the mirror motor 13 and the drum motor 21 are continually driven during the predetermined time t by the operation of the timer circuit 15. Therefore, when the second exposing operation is executed before the predetermined time t passes, the mirror motor 13 and the drum motor 21 will still be driven at the predetermined rotational speed. Therefore, it is not necessary to wait until the mirror motor 13 and the drum motor 21 reach the predetermined rotational speed and the second exposing operation can be executed at once. The predetermined time t can be set at a time longer than the time for the exposing operation cycle when the exposing operation is desired to be executed continually. For instance, the predetermined time t can be set at a time longer than six seconds in the laser printer which can print 10 sheets per minute.

After the exposing operation is executed and a predetermined time t passes, the mirror motor 13 and the drum motor 21 are stopped if the next exposing operation is not executed before the predetermined time t passes. Accordingly, the mirror motor 13 and the drum motor 21 are not driven continually. Therefore, the mirror motor 13 and the drum motor 21 can be used for a long time and the noise generated thereby is decreased.

The device according to the present invention provides significant advantages over the three types of known exposing devices. The mirror motor is not required to rotate at all times as it is in the first type, thereby minimizing noise generation and excessive wear on the motor. The present device minimizes delays of the exposing operation until the rotational speeds of the mirror motor and drum motor reach their predetermined rotational speeds, such delays being experienced when the second known type of device is used. The present device, therefore, in most instances enables immediate execution of an exposing operation. The present device further minimizes the delays which can be experienced using the third type of known device. Because the third type rotates the mirror motor only when image information is stored in the control device, any delay in the transfer of image information to the control device causes delay in the exposing operation until predetermined rotational speeds are reached. The present invention, in utilizing controlling means which continually drives the mirror motor during a predetermined time period from the end of scanning, thus minimizes noise generation, excessive wear and exposing operation delays, thereby providing a device which is particularly advantageous over known devices.

While this invention has been described in conjunction with the specific embodiments thereof, it is evident that many alternatives, modifications and variations will be apparent to those skilled in the art without departing from the scope of the present invention. For example, a timer circuit may be used in which the time t is changeable at a desired time. Accordingly, the preferred embodiments of the invention as set forth herein are intended to be illustrative, not limiting. Various changes may be made without departing from the spirit and scope of the invention as defined in the following claims.

What is claimed is:

1. An exposing device for scanning a photosensitive member with a laser beam, said exposing device comprising:
   laser beam emitting means for emitting a laser beam based on information of an image;
   deflecting means for deflecting the laser beam emitted from said laser beam emitting means to the photosensitive member;

moving means for moving said deflecting means to effect scanning of the photosensitive member with the laser beam deflected by said deflecting means; and controlling means for stopping said moving means only after a predetermined time period passes from the end of scanning of the photosensitive member.

2. The exposing device as recited in claim 1, wherein said controlling means includes a control device, a timer circuit and at least one driving circuit.

3. The exposing device as recited in claim 2, wherein said controlling means includes two said driving circuits, one driving circuit driving the deflecting means and the other driving circuit driving the photosensitive member.

4. The exposing device as recited in claim 2, wherein said timer circuit includes a one-shot multivibrator which outputs a pulse signal in response to a signal from said control device.

5. The exposing device as recited in claim 2, wherein said control device generates a driving signal for driving said moving means only during the period in which the exposing operation is executed, and said timer circuit delays the period of generation of the driving signal for the predetermined time period.

6. An exposing device for scanning a photosensitive member with a laser beam, said exposing device comprising:

laser beam emitting means for emitting a laser beam based on information of an image;

deflecting means for deflecting the laser beam emitted from said laser beam emitting means to the photosensitive member;

moving means for moving said deflecting means to effect scanning of the photosensitive member with the laser beam deflected by said deflecting means; and control means for controlling said laser beam emitting means and said moving means such that said laser beam emitting means emits a laser beam and said moving means moves said deflecting means upon receipt of a signal to initiate an exposing operation, said laser beam emitting means stopping emission of the laser beam and said moving means continuing movement of said deflecting means when the exposing operation is finished, and said moving means stopping movement of said deflecting means only when a predetermined time has passed from the time at which the exposing operation is finished prior to initiation of another exposing operation.

7. The exposing device as recited in claim 6, wherein said control means includes a control device, timer circuit and at least one driving circuit.

8. The exposing device as recited in claim 7, wherein said control means includes two said driving circuits, one driving circuit driving the deflecting means and the other driving circuit driving the photosensitive member.

9. The exposing device as recited in claim 7, wherein said timer circuit includes a one-shot multivibrator which outputs a pulse signal in response to a signal from said control device.

10. The exposing device as recited in claim 7, wherein said control device generates a driving signal for driving said moving means only during the period in which the exposing operation is executed, and said timer circuit delays the period of generation of the driving signal for the predetermined time period.

11. An exposing device comprising:

laser beam emitting means for emitting a laser beam based on information of an image;

a rotatable photosensitive drum;

a drum motor which rotates said drum;

a polygonal mirror for reflecting the laser beam emitted from said laser beam emitting means to said photosensitive drum;

a mirror motor which rotates said polygonal mirror so as to scan said photosensitive drum with the laser beam reflected by said polygonal mirror; and control means for driving said drum motor and said mirror motor upon receipt of a signal to initiate an exposing operation and for stopping said drum motor and mirror motor only when a predetermined time has passed from the time at which the exposing operation is finished.

12. The exposing device as recited in claim 11, wherein said control means includes a control device, a timer circuit and at least one driving circuit.

13. The exposing device as recited in claim 12, wherein said control means includes two said driving circuits, one driving circuit driving the drum motor, the other driving circuit driving the mirror motor.

14. The exposing device as recited in claim 13, wherein said control device generates a driving signal for driving said mirror motor and drum motor only during the period in which the exposing operation is executed, and said timer circuit delays the period of generation of the driving signal for the predetermined period.

15. The exposing device as recited in claim 12, wherein said timer circuit includes a one-shot multivibrator which outputs a pulse signal in response to a signal from said control device.

16. The exposing device as recited in claim 11, wherein said control means stops said drum motor and said mirror motor only when a predetermined time has passed prior to initiation of another exposing operation.

* * * * *